US012603541B2

(12) United States Patent
Mogro Zambrano et al.

(10) Patent No.: US 12,603,541 B2
(45) Date of Patent: Apr. 14, 2026

(54) ELECTRIC DRIVE UNIT THAT INCLUDES A FLUID FLOW PATH

(71) Applicant: Schaeffler Technologies AG & Co. KG, Herzogenaurach (DE)

(72) Inventors: Antonio Eduardo Mogro Zambrano, Puebla (MX); Diego Alberto Abreu, Mexico City (MX); Maximilian Podschwadt, Saline, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 283 days.

(21) Appl. No.: 18/427,010

(22) Filed: Jan. 30, 2024

(65) Prior Publication Data

US 2025/0246967 A1      Jul. 31, 2025

(51) Int. Cl.
H02K 5/20 (2006.01)
H02K 9/19 (2006.01)

(52) U.S. Cl.
CPC .............. H02K 5/203 (2021.01); H02K 9/19 (2013.01)

(58) Field of Classification Search
CPC ........... H02K 1/32; H02K 5/203; H02K 9/197
See application file for complete search history.

(56) References Cited

U.S. PATENT DOCUMENTS

| | | | |
|---|---|---|---|
| 2016/0036297 A1* | 2/2016 | Rues ........................ | H02K 9/19 |
| | | | 310/54 |
| 2019/0003572 A1* | 1/2019 | Dellal ................... | F16C 25/083 |
| 2022/0282781 A1* | 9/2022 | Nakata ..................... | H02K 5/15 |
| 2023/0387755 A1 | 11/2023 | Nelson et al. | |

* cited by examiner

Primary Examiner — Oluseye Iwarere
Assistant Examiner — Masoud Vaziri
(74) Attorney, Agent, or Firm — Price Heneveld LLP

(57) ABSTRACT

A drive unit for a vehicle includes an electric motor, an output shaft, and a housing. The electric motor includes a rotor shaft having an inner surface with a hollow accessible via an opening at an axial end of the rotor shaft and an outer surface opposite the inner surface. The output shaft extends into the hollow through the opening. The housing houses the electric motor and defines a fluid flow path for fluid. The housing has a collar portion about the output shaft, a first holding portion on a first axial side of the collar portion and having baffles that are circumferentially offset from each other, a second holding portion on a second axial side of the collar portion opposite the first axial side, such that the collar portion is positioned axially between the first and second holding portions, and conduits extending between the first and second holding portions.

20 Claims, 9 Drawing Sheets

ELECTRIC DRIVE UNIT THAT INCLUDES A FLUID FLOW PATH

FIELD OF THE DISCLOSURE

The present disclosure generally relates to an electric drive unit. More specifically, the present disclosure relates to a fluid flow path that is defined at least partially by a housing of the electric drive unit.

BACKGROUND OF THE DISCLOSURE

Vehicles can include electric drive units. Electric drive units may include fluid flow paths that convey fluid throughout the electric drive units for cooling and lubrication. Improved fluid flow paths for electric drive units may be desired.

SUMMARY OF THE DISCLOSURE

According to a first aspect of the present disclosure, a drive unit for a vehicle includes an electric motor, an output shaft, and a housing. The electric motor includes a rotor shaft having an inner rotor shaft surface that defines a hollow that is accessible via an opening defined at an axial end of the rotor shaft and an outer rotor shaft surface opposite the inner rotor shaft surface. The output shaft extends into the hollow through the opening. The housing houses the electric motor and defines a fluid flow path that conveys fluid. The housing has a collar portion that extends circumferentially about the output shaft, a first holding portion disposed on a first axial side of the collar portion and having a plurality of baffles that are circumferentially offset from each other, a second holding portion disposed on a second axial side of the collar portion opposite the first axial side, such that the collar portion is positioned axially between the first and second holding portions, and a plurality of conduits extending between the first holding portion and the second holding portion. The fluid flow path is configured to convey the fluid, such that a first portion of the fluid flows onto the collar portion via a passage of the housing and through the opening into the hollow defined by the inner rotor shaft surface in a first axial direction, and a second portion of the fluid flows onto the collar portion via the passage of the housing, from the collar portion to the first holding portion in the first axial direction, and from the first holding portion to the second holding portion via at least one of the plurality of conduits in a second axial direction opposite the first axial direction.

Embodiments of the first aspect of the disclosure can include any one or a combination of the following features:
  the electric motor is configured to drive rotation of the rotor shaft, rotation of the rotor shaft encourages circumferential flow of fluid along the first holding portion of the housing, and the plurality of baffles are configured to disrupt the circumferential flow of fluid along the first holding portion of the housing;
  each of the plurality of baffles is radially elongated;
  a first seal positioned radially between the outer rotor shaft surface and the first holding portion of the housing and configured to cooperate with the first holding portion of the housing to define a first receiving area for fluid;
  the first seal delimits the first receiving area in the first axial direction;
  a second seal positioned radially between the output shaft and the second holding portion of the housing and configured to cooperate with the second holding portion to define a second receiving area for fluid that is in fluid communication with the first receiving area via the plurality of conduits;
  the second seal delimits the second receiving area in the second axial direction; and
  a bearing positioned radially between the output shaft and the second holding portion of the housing and configured to support and facilitate rotation of the output shaft relative to the housing, wherein the bearing is disposed within the second receiving area and is configured to be lubricated by fluid that enters the second receiving area via the plurality of conduits.

According to a second aspect of the present disclosure, a drive unit for a vehicle includes an electric motor, an output shaft, and a housing. The electric motor includes a rotor shaft that defines a hollow that is accessible via an opening defined at an axial end of the rotor shaft. The output shaft extends into the hollow through the opening. The housing houses the electric motor and defines a fluid flow path that conveys fluid. The housing has a collar portion that extends circumferentially about the output shaft and a first holding portion disposed on a first axial side of the collar portion and having at least one baffle. The fluid flow path is configured to convey the fluid, such that a first portion of the fluid flows onto the collar portion via a passage of the housing and through the opening into the hollow defined by the rotor shaft in a first axial direction, and a second portion of the fluid flows onto the collar portion via the passage of the housing and from the collar portion to the first holding portion in the first axial direction. Further, the at least one baffle is configured to disrupt circumferential flow of the second portion of the fluid along the first holding portion of the housing.

Embodiments of the second aspect of the disclosure can include any one or a combination of the following features:
  the at least one baffle comprises a plurality of baffles that are circumferentially offset from each other;
  the at least one baffle is radially elongated;
  a first seal positioned radially between the rotor shaft and the first holding portion of the housing and configured to cooperate with the first holding portion of the housing to define a first receiving area for fluid;
  the first seal delimits the first receiving area in the first axial direction; and
  the housing further comprises a second holding portion disposed on a second axial side of the collar portion opposite the first axial side, such that the collar portion is positioned axially between the first and second holding portions, and at least one conduit extending between the first holding portion and the second holding portion, wherein the second portion of the fluid further flows from the first holding portion of the housing to the second holding portion of the housing via the at least one conduit.

According to a third aspect of the present disclosure, a drive unit for a vehicle includes an electric motor, an output shaft, and a housing. The electric motor includes a rotor shaft that defines a hollow that is accessible via an opening defined at an axial end of the rotor shaft. The output shaft extends into the hollow through the opening. The housing houses the electric motor and defines a fluid flow path that conveys fluid. The housing has a collar portion that extends circumferentially about the output shaft, a first holding portion disposed on a first axial side of the collar portion, a second holding portion disposed on a second axial side of the collar portion opposite the first axial side, and at least one conduit that extends between the first holding portion and the second holding portion. The fluid flow path is configured to convey the fluid, such that a first portion of the fluid flows onto the collar portion via a passage of the housing and through the opening into the hollow defined by the rotor shaft in a first axial direction, and a second portion of the fluid flows onto the collar portion via the passage of the housing, from the collar portion to the first holding portion in the first axial direction, and from the first holding portion to the second holding portion via the at least one conduit in a second axial direction opposite the first axial direction.

Embodiments of the third aspect of the disclosure can include any one or a combination of the following features:

the at least one conduit comprises a plurality of conduits that extend between the first holding portion and the second holding portion;

a first seal positioned radially between an outer rotor shaft surface and the first holding portion of the housing and configured to cooperate with the first holding portion of the housing to define a first receiving area for fluid, wherein the first seal delimits the first receiving area in the first axial direction;

a second seal positioned radially between the output shaft and the second holding portion of the housing and configured to cooperate with the second holding portion to define a second receiving area for fluid that is in fluid communication with the first receiving area via the plurality of conduits, wherein the second seal delimits the second receiving area in the second axial direction;

a bearing positioned radially between the output shaft and the second holding portion of the housing and configured to support and facilitate rotation of the output shaft relative to the housing, wherein the bearing is disposed within the second receiving area and is configured to be lubricated by fluid that enters the second receiving area via the plurality of conduits; and the first holding portion of the housing includes at least one baffle that is configured to disrupt the circumferential flow within a first receiving area defined by the first holding portion of the housing.

These and other features, advantages, and objects of the present disclosure will be further understood and appreciated by those skilled in the art by reference to the following specification, claims, and appended drawings.

Figure 1:
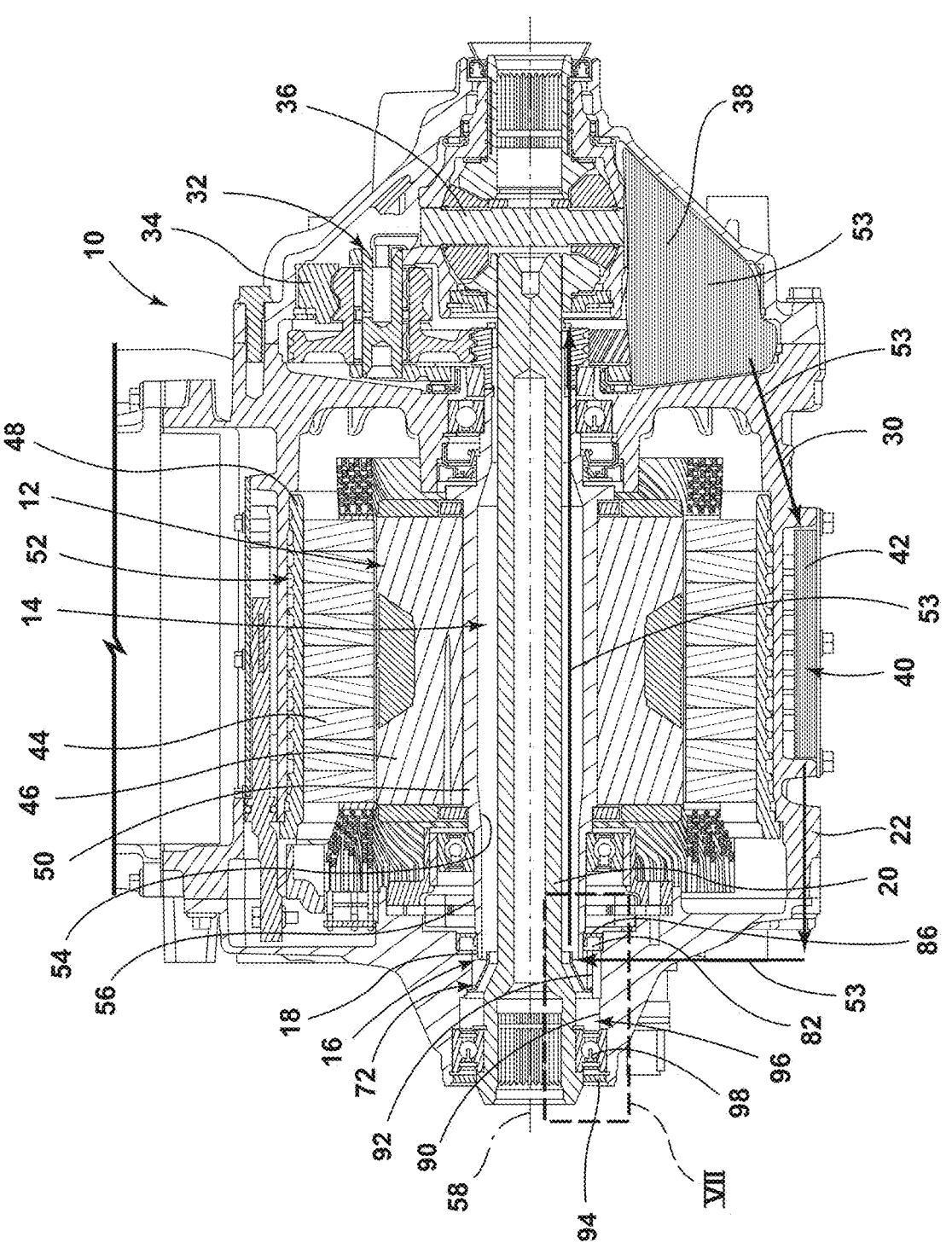
FIG. 1 is a cross-sectional view of an electric drive unit including a fluid flow path according to an embodiment of the present disclosure.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an" mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a rotor shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. The term "circumferential" and derivatives thereof, such as "circumferentially," shall be understood in relation to the axis of the aforementioned shaft.

Referring now to FIGS. 1-6, a drive unit 10 for a vehicle includes an electric motor 12. The electric motor 12 includes a rotor shaft 50 that defines a hollow 14 that is accessible via an opening 16 defined at an axial end 18 of the rotor shaft 50. An output shaft 20 extends into the hollow 14 through the opening 16. A housing 22 houses the electric motor 12. The housing 22 includes a collar portion 24 that has an interior surface 26 that is substantially cylindrical and that extends circumferentially about the output shaft 20. The housing 22 further includes a passage 28 that extends substantially tangentially outward from the interior surface 26 of the collar portion 24. The collar portion 24 and the passage 28 define a portion of a fluid flow path 30.

Referring now to FIG. 1, an electric drive unit 10 for a vehicle is illustrated. The electric drive unit 10 may be designed as an electric axle ("the axle"), in various embodiments. The electric drive unit 10 includes a housing 22. The housing 22 can be functionally divided into a motor or center housing region and a gear or gearbox housing region. In some embodiments, the housing 22 may be designed as a die-cast aluminum housing 22 and may be formed in multiple parts. A gearbox 32 may include a planetary gearset 34, a differential 36, and a sump 38, for example. A heat exchanger 40 can be integrated with, or integral with, the center housing region. That is, the existing die casting process for the center housing region may be used to form the heat exchanger 40, in some implementations. A fluid chamber 42 of the heat exchanger 40 may be formed in an outer surface (for example, by casting) of the center housing region. In some embodiments, the heat exchanger 40 may be located on the bottom of the electric drive unit 10, as illustrated in FIG. 1. The heat exchanger 40 may be located in various locations, in various embodiments.

Referring still to FIG. 1, the electric drive unit 10 includes the electric motor 12. The electric motor 12 includes a stator 44, a rotor 46, a stator carrier 48, and the rotor shaft 50. The stator 44 also includes a fluid jacket 52 formed, and bounded, by the stator carrier 48 and a fluid chamber bottom wall of the fluid chamber 42. In this way, the stator carrier 48 forms an inner wall or a portion of the stator fluid jacket 52 and the fluid chamber bottom wall forms an outer wall or a portion of the stator fluid jacket 52. The cavity formed therebetween may be filled with a fluid 53, such as a water-glycol mixture, for example, for cooling the stator 44 and another fluid 53, such as oil, that is disposed within the fluid chamber 42 of the heat exchanger 40. In this arrangement, the heat exchanger 40 uses the existing cool walls of the stator fluid jacket 52 to cool fluid 53 within the fluid chamber 42. That is, the fluid chamber bottom wall is in contact with the stator fluid jacket volume on an inner surface and is in contact with the fluid 53 from the heat exchanger 40 on an outer surface and functions as a "cool wall." In various embodiments, the fluid chamber 42 of the heat exchanger 40 can be filled with oil, such that the fluid chamber 42 is an oil chamber. It is contemplated that a variety of types of fluids 53 can be utilized within the cavity defined by the stator fluid jacket 52 and the fluid chamber 42. In operation of an exemplary embodiment of the electric drive unit 10, the gearbox 32 collects and distributes (via splashing from rotating components of the gearbox 32) oil from the gearbox sump 38 to the heat exchanger 40. The heat exchanger 40 cools the oil with the water that is disposed on the opposing side of the fluid chamber bottom wall within the stator fluid jacket 52. The cooled oil is then routed to the rotor shaft 50 along the fluid flow path 30 to provide active rotor 46 cooling. Fluid 53, such as oil, as described herein, may be routed along the fluid flow path 30 to the rotor shaft 50 via the passage 28 of the housing 22 and the collar portion 24 of the housing 22, as described further herein. In various implementations, rotation of the rotor shaft 50 via operation of the motor 12 may propel fluid 53 along the fluid flow path 30 due to a tapered inner rotor shaft surface 54, as described further herein.

Figure 2:
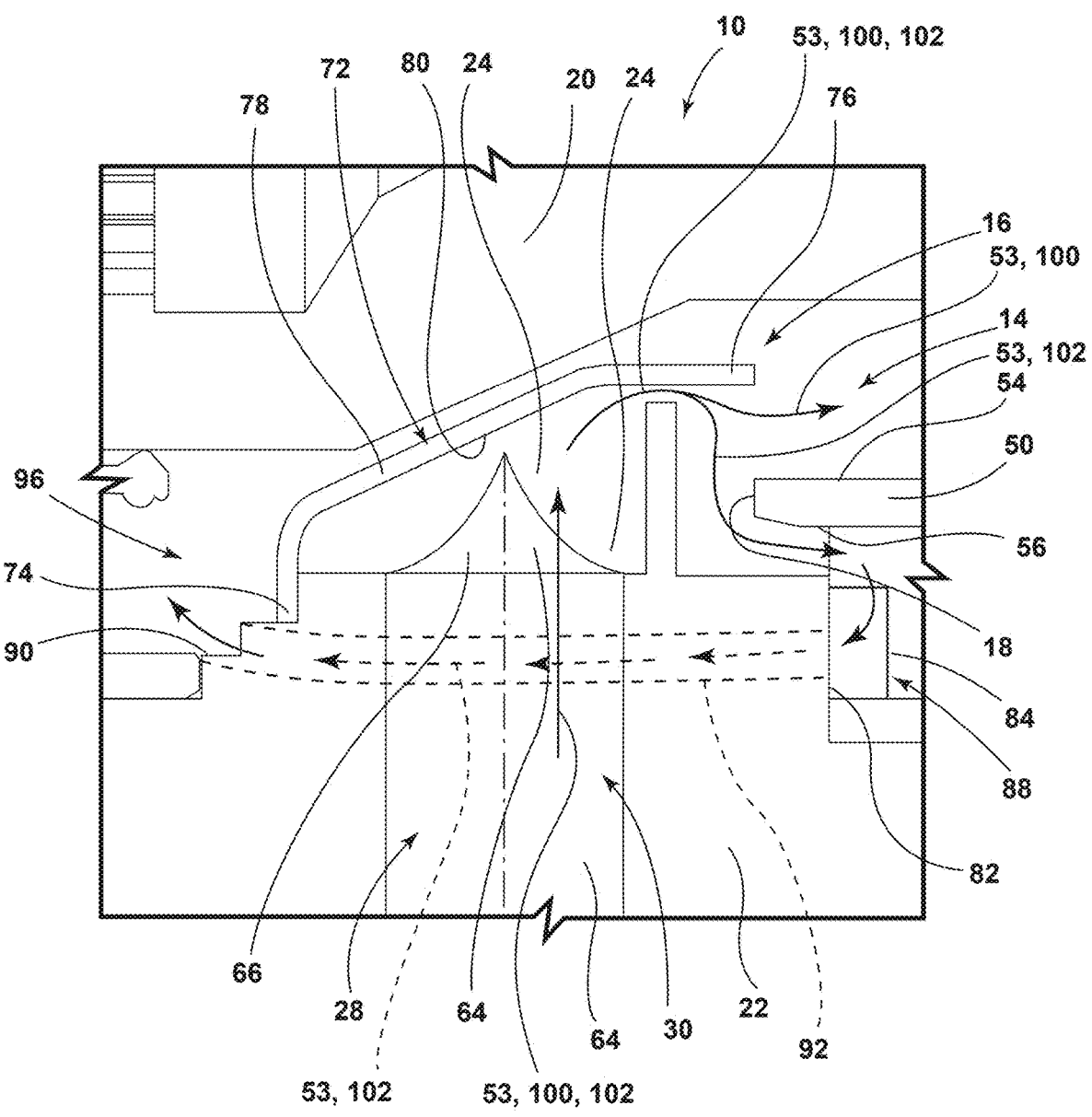
FIG. 2 is an enlarged cross-sectional view of a portion of the fluid flow path illustrating a passage of a housing of the electric drive unit and a conduit extending between a first holding portion of the housing and a second holding portion of the housing.
Figure 3:
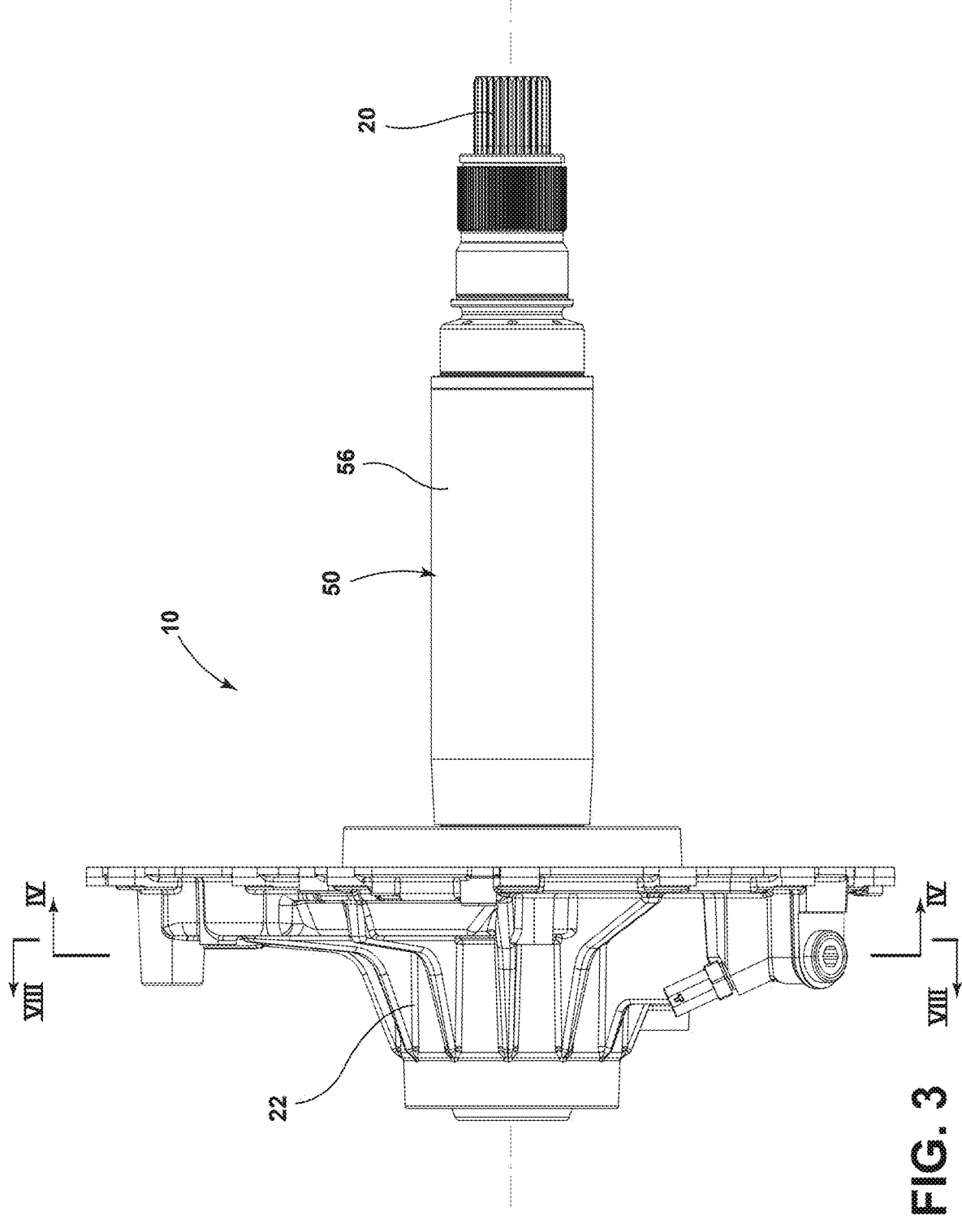
FIG. 3 is a front elevational view of a portion of an electric drive unit illustrating a portion of a housing of the electric drive unit, a rotor shaft, and an output shaft.

Referring now to FIGS. 1 and 2, the rotor shaft 50 of the electric motor 12 includes the inner rotor shaft surface 54 and an outer rotor shaft surface 56 opposite the inner rotor shaft surface 54. The inner rotor shaft surface 54 of the rotor shaft 50 defines a hollow 14. As illustrated in FIG. 1, at least a portion of the inner rotor shaft surface 54 tapers radially outboard as the inner rotor shaft surface 54 extends axially toward the gearbox 32 of the electric drive unit 10. In various embodiments, a portion of the inner rotor shaft surface 54 tapers radially outboard as the portion of the inner rotor shaft surface 54 extends axially away from the substantially cylindrical interior surface 26 of the collar portion 24 of the housing 22. This tapering of the inner rotor shaft surface 54 in combination with rotation of the rotor shaft 50 via the motor 12 may cause fluid 53 to be propelled axially toward the gearbox 32 along the inner rotor shaft surface 54 of the rotor shaft 50, which, in some embodiments, may act as a pump to propel fluid 53 throughout the fluid flow path 30 of the electric drive unit 10. As shown in FIG. 1, the rotor shaft 50 includes an opening 16 at an axial end 18 of the rotor shaft 50 that is axially distal from the gearbox 32. The opening 16 provides access to the hollow 14 defined by the inner rotor shaft surface 54.

Referring still to FIGS. 1 and 2, the output shaft 20 of the electric drive unit 10 extends through the opening 16 and into the hollow 14 defined by the inner rotor shaft surface 54 of the rotor shaft 50 to the gearbox 32, wherein the output shaft 20 is engaged with the differential 36 of the gearbox 32. Rotation of the rotor shaft 50 is configured to drive rotation of the output shaft 20.

Figure 4:
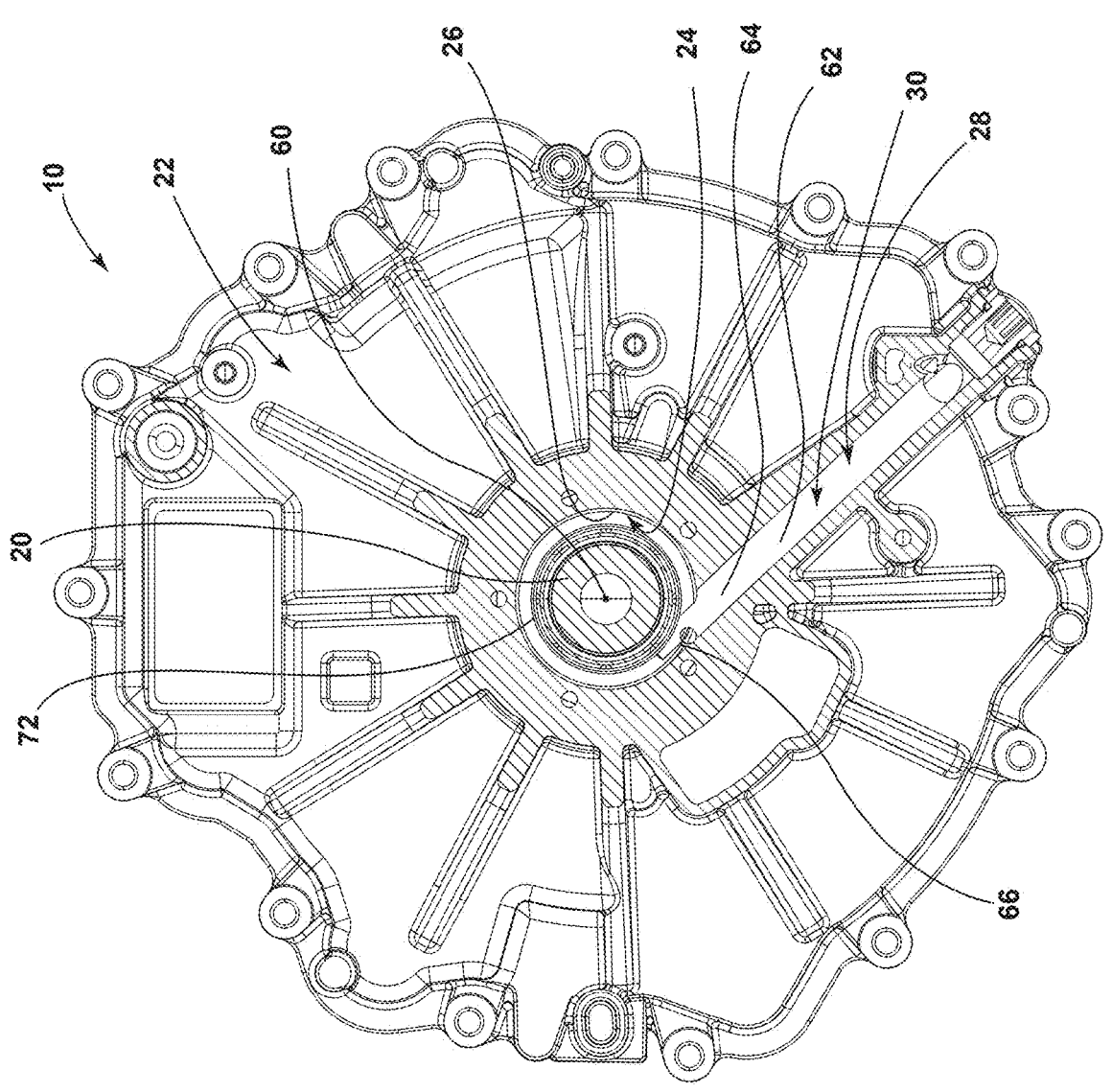
FIG. 4 is a cross-sectional view of the electric drive unit of FIG. 3 taken at line IV-IV illustrating a collar portion of the housing that includes an interior surface that is substantially cylindrical and a passage of the housing that extends substantially tangentially outward from the interior surface of the collar portion.
Figure 5:
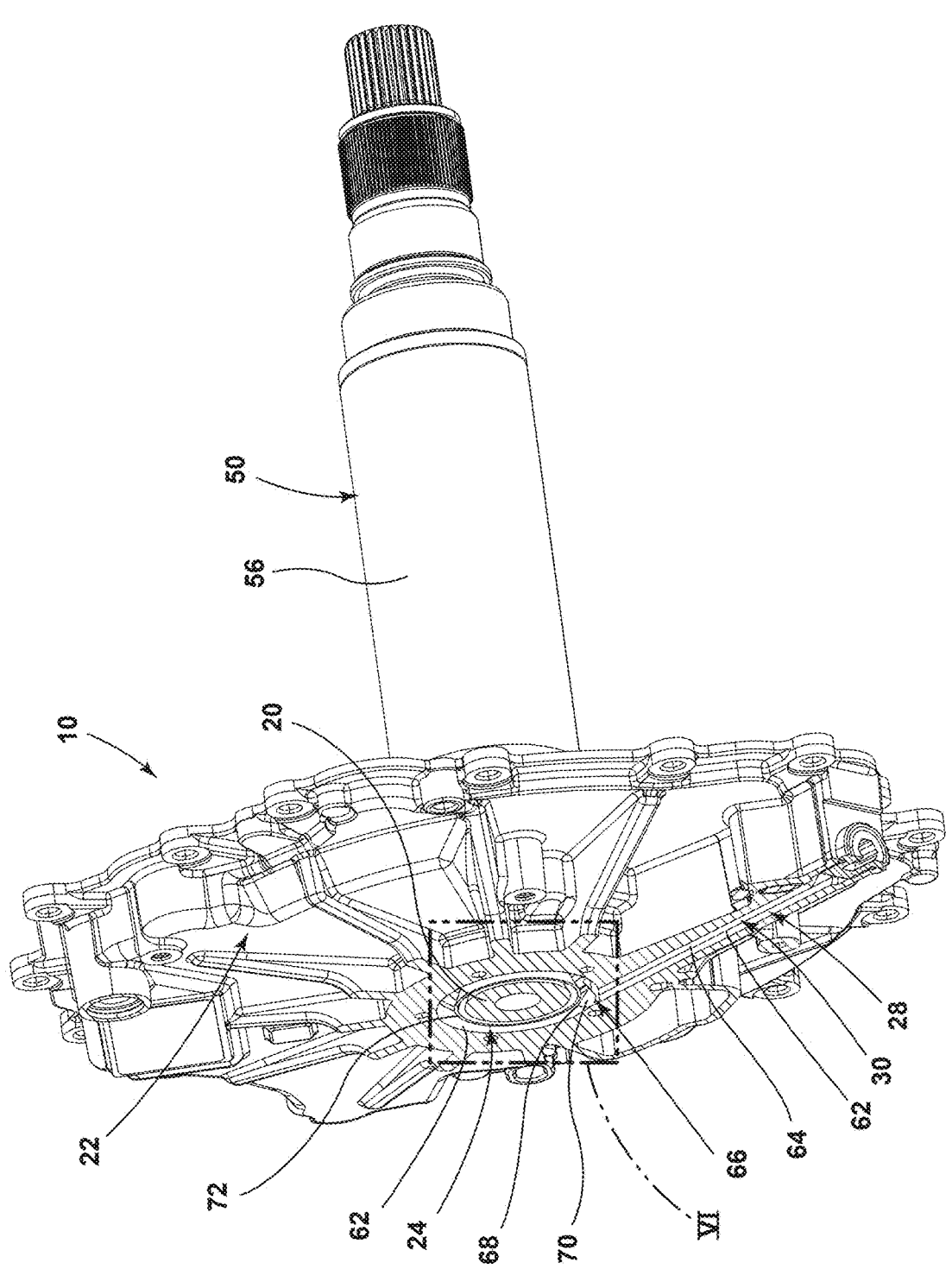
FIG. 5 is a top perspective view of the cross-sectional view of the electric drive unit shown in FIG. 4.
Figure 6:
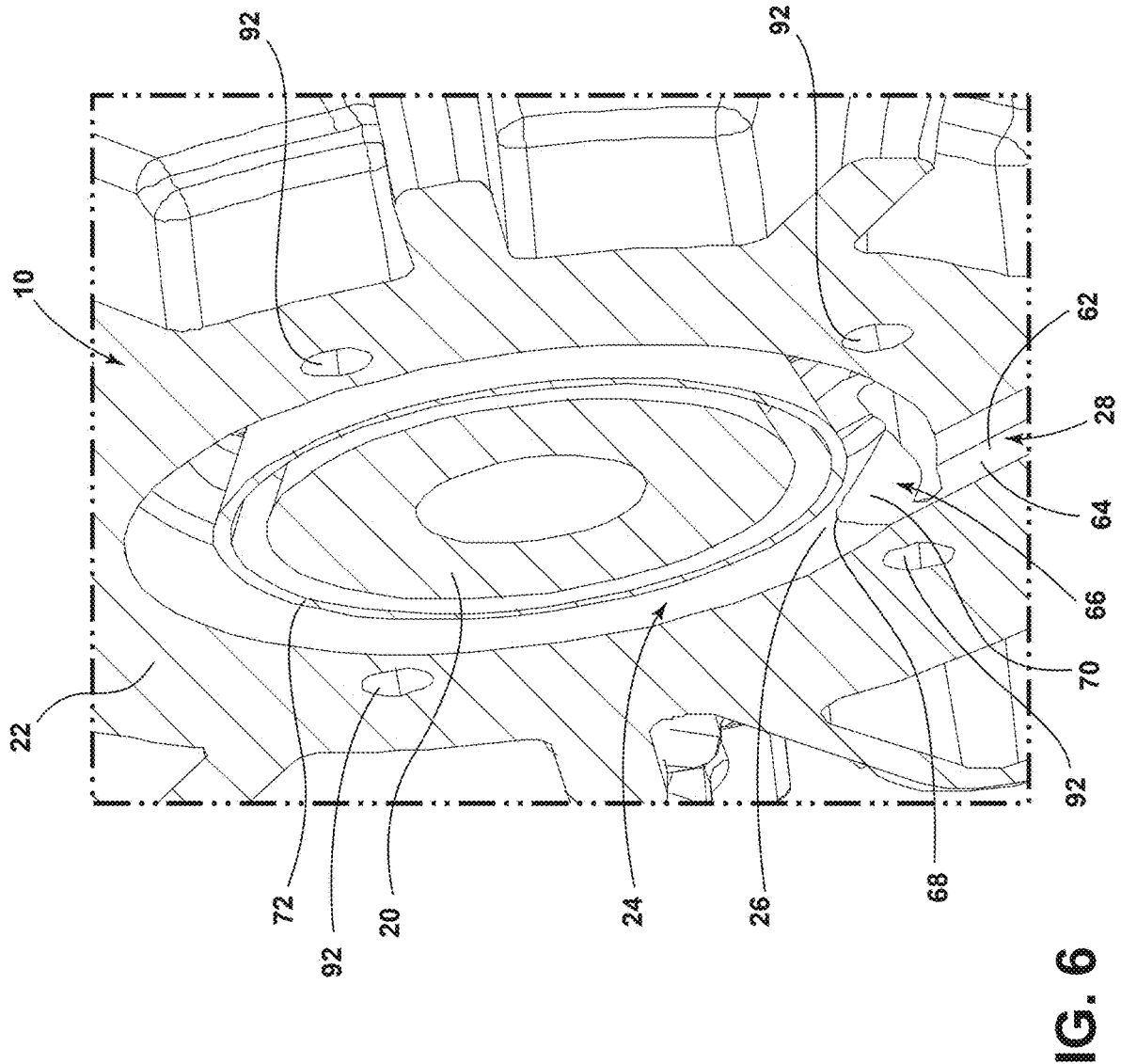
FIG. 6 is an enlarged view of area VI of FIG. 5 illustrating the interior surface of the collar portion of the housing and first and second portions of the passage of the housing.

Referring now to FIGS. 2-6, the housing 22 defines a portion of the fluid flow path 30. In various implementations, the housing 22 includes the collar portion 24. As illustrated in FIGS. 4-6, the collar portion 24 includes the interior surface 26. The interior surface 26 of the collar portion 24 is substantially cylindrical and extends circumferentially about the output shaft 20 of the electric drive unit 10. In various implementations, the interior surface 26 of the collar portion 24 extends circumferentially about a portion of the output shaft 20 that is outside of the hollow 14 defined by the rotor shaft 50. As described further herein, the substantially cylindrical interior surface 26 of the collar portion 24 defines a portion of the fluid flow path 30, and the substantially cylindrical nature of the interior surface 26 may allow fluid 53 to flow continuously with minimal interruption along the fluid flow path 30. It is to be understood that the substantially cylindrical interior surface 26 of the collar portion 24 may not be entirely cylindrical, due to at least the interruption of the interior surface 26 by the passage 28 of the housing 22, as described further herein. In various implementations, the output shaft 20 is configured to rotate about an axis 58 that substantially corresponds with a radial center point 60 of the substantially cylindrical interior surface 26 of the collar portion 24.

Referring still to FIGS. 2-6, the housing 22 includes the passage 28. As illustrated in FIG. 4, the passage 28 of the housing 22 defines a portion of the fluid flow path 30 and extends substantially tangentially outward from the interior surface 26 of the collar portion 24 of the housing 22. In the embodiment illustrated in FIGS. 4-6, the passage 28 extends substantially tangentially outward from the collar portion 24 relative to a portion of the substantially cylindrical interior surface 26 of the collar portion 24 that borders a portion of the passage 28. As illustrated in FIGS. 2 and 6, the passage 28 may include a first portion 64 that includes a substantially cylindrical inner surface 62 and a second portion 66 that interrupts the substantially cylindrical interior surface 26 of the collar portion 24 of the housing 22. The second portion 66 of the passage 28 may include an inner surface 62 with a curvature that is substantially equal to the curvature of the substantially cylindrical inner surface 62 of the first portion 64 of the passage 28. As illustrated in FIG. 6, the second portion 66 of the passage 28 tapers to an endpoint 68. The endpoint 68 of the second portion 66 borders the substantially cylindrical interior surface 26 of the collar portion 24 of the housing 22. In various implementations, the passage 28 is substantially tangential with the substantially cylindrical interior surface 26 of the collar portion 24 at the endpoint 68 of the second portion 66 of the passage 28. As illustrated in FIG. 6, the second portion 66 defines a trough 70 that has the same curvature as the substantially cylindrical inner surface 62 of the first portion 64 of the passage 28, and the trough 70 tapers to the endpoint 68 that is substantially tangential with the substantially cylindrical interior surface 26 of the collar portion 24 that borders the endpoint 68 of the second portion 66.

Referring now to FIGS. 1-6, the electric drive unit 10 may include a deflector 72. The deflector 72 may extend circumferentially about an outer surface of the output shaft 20, as illustrated in FIG. 1. The deflector 72 may be configured to redirect fluid 53 flowing along the fluid flow path 30 away from a portion of at least one of the rotor shaft 50 and the output shaft 20. For example, in the embodiment illustrated in FIG. 1, the deflector 72 is configured to redirect fluid 53 that would otherwise flow onto the rotating output shaft 20 into the hollow 14 defined by the inner rotor shaft surface 54 via the opening 16 at the axial end 18 of the rotor shaft 50. As illustrated in FIG. 2, the deflector 72 is axially aligned with a substantially cylindrical interior surface 26 of the collar portion 24 of the housing 22.

Referring now to FIGS. 1 and 2, the deflector 72 includes an outer ring 74, an inner ring 76, and a connector ring 78 that extends radially inboard and axially from the outer ring 74 to the inner ring 76. As illustrated in FIG. 2, the connector ring 78 includes an annular surface 80 that extends at a slope or angle radially inboard and axially from the outer ring 74 to the inner ring 76. The connector ring 78 extends radially inboard and axially toward the hollow 14 from the outer ring 74 to the inner ring 76. In various implementations, the surface of the deflector 72 that is aligned with the collar portion 24 of the housing 22 and/or the passage 28 of the housing 22 is angled relative to the flow direction of the fluid 53 flowing from the passage 28 into the collar portion 24. As such, fluid 53 that flows radially inboard of the collar portion

24 may be turned by the deflector 72 into the rotor shaft 50 about 90°. In various embodiments, the fluid 53 can be gradually turned about 90°. The gradual turning of the fluid 53 may advantageously reduce pressure drop compared to a system in which fluid 53 flows directly to an outer surface of the output shaft 20 from the passage 28 of the housing 22. As illustrated in FIG. 2, in some implementations, the outer ring 74 of the deflector 72 is in an axially-spaced relationship with the substantially cylindrical interior surface 26 of the collar portion 24, and the inner ring 76 is in an axially-spaced relationship with the substantially cylindrical interior surface 26 of the collar portion 24, such that the substantially cylindrical interior surface 26 of the collar portion 24 is disposed wholly, axially between the inner and outer rings 76, 74 of the deflector 72. In some implementations, at least a portion of the inner ring 76 of the deflector 72 is axially aligned with the opening 16 at the axial end 18 of the rotor shaft 50, as illustrated in FIG. 2.

Referring now to FIGS. 1, 2, and 7-9, the housing 22 of the electric drive unit 10 includes a first holding portion 82. The first holding portion 82 is disposed on a first axial side of the collar portion 24 of the housing 22. The first holding portion 82 may be configured to receive fluid 53 that is conveyed onto the collar portion 24 of the housing 22 from the passage 28 but does not enter the hollow 14 defined by the rotor shaft 50, as described further herein. In various implementations, the first holding portion 82 of the housing 22 includes at least one baffle 84. The at least one baffle 84 may be configured to disrupt the circumferential flow of fluid 53 along the first holding portion 82 of the housing 22. The at least one baffle 84 may be radially elongated. In the embodiment illustrated in FIGS. 8 and 9, the first holding portion 82 of the housing 22 includes a plurality of baffles 84. As illustrated, the plurality of baffles 84 are circumferentially offset from each other, and each of the plurality of baffles 84 is radially elongated.

Figure 7:
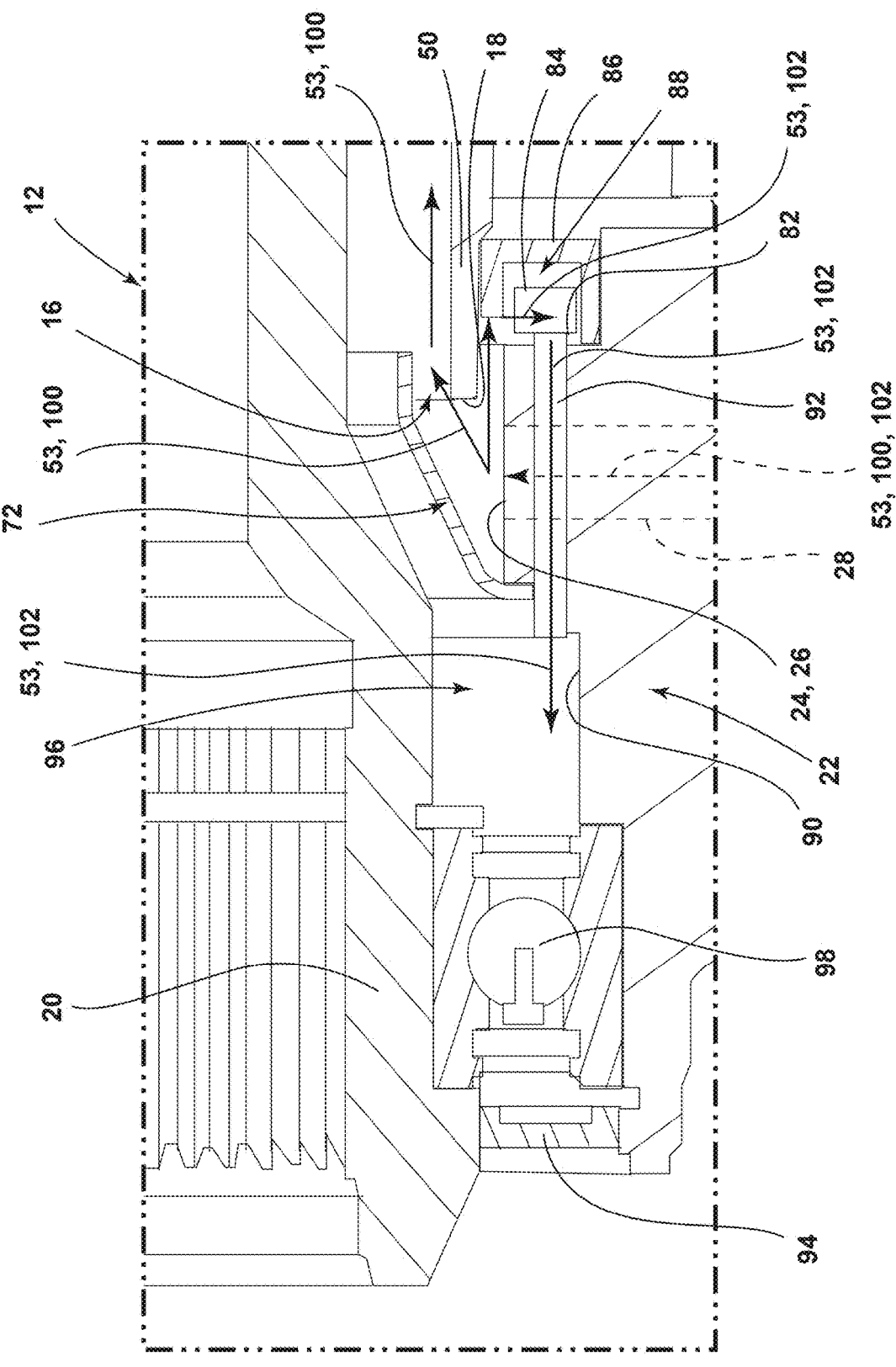
FIG. 7 is an enlarged view of area VII of FIG. 1 illustrating a housing of the electric drive unit that includes a first holding portion that defines a first receiving area, a second holding portion that defines a second receiving area, and a conduit that extends between the first and second receiving areas.
Figure 8:
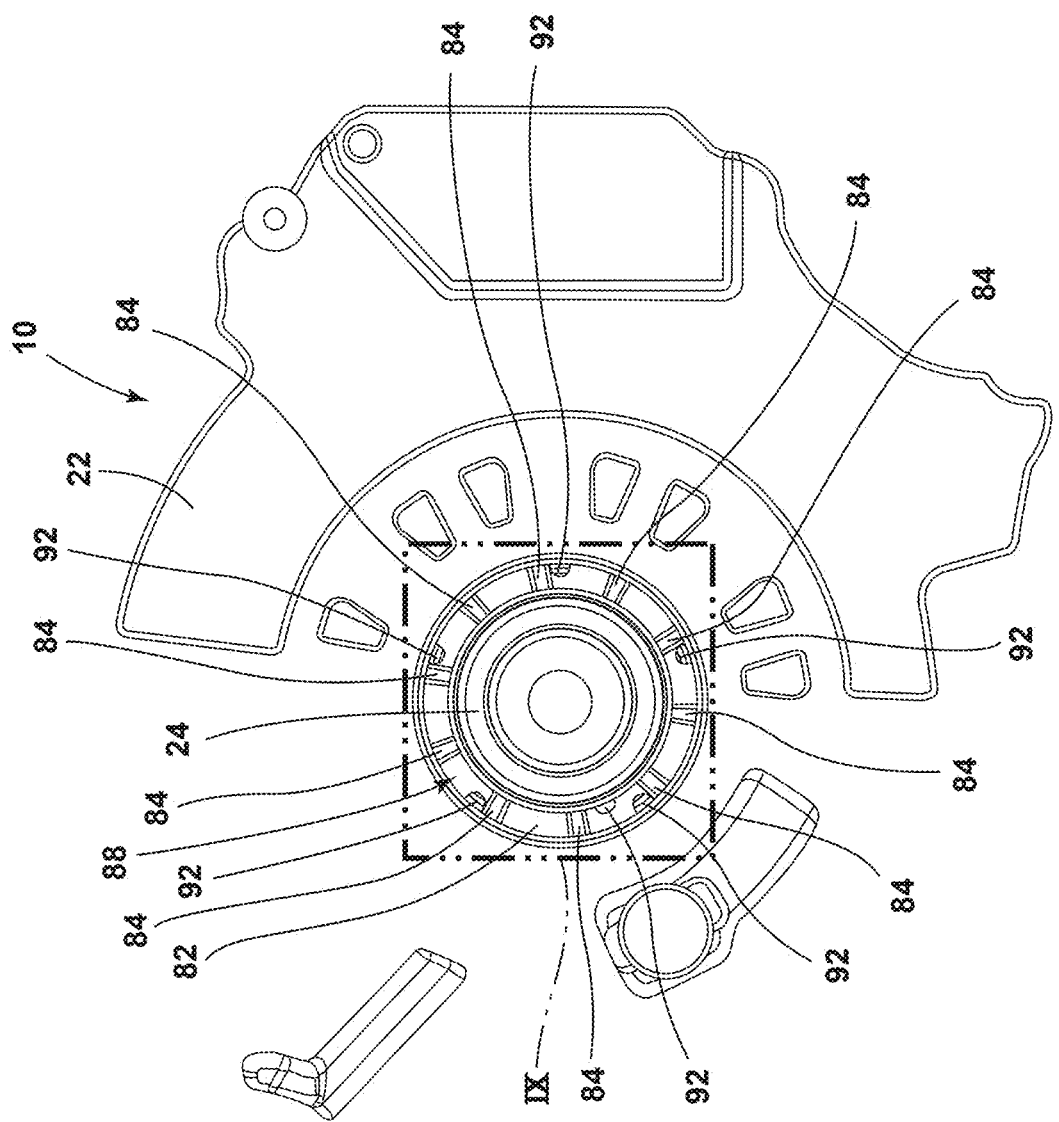
FIG. 8 is a cross-sectional view of the electric drive unit taken at line VIII-VIII of FIG. 3 illustrating a first holding portion of a housing that includes a plurality of baffles that are radially elongated.

Referring now to FIGS. 1 and 7-9, the electric drive unit 10 can include a first seal 86. As illustrated in FIG. 7, the first seal 86 is positioned radially between the outer rotor shaft surface 56 and the first holding portion 82 of the housing 22. The first seal 86 is configured to cooperate with the first holding portion 82 of the housing 22 to define a first receiving area 88 for fluid 53. Fluid 53 that flows out of the passage 28, onto the collar portion 24, and axially toward the opening 16 to the hollow 14 defined by the rotor shaft 50 but does not enter the rotor shaft 50 may be received within the first receiving area 88, as described further herein. In various implementations, the first seal 86 delimits the first receiving area 88 in a first axial direction. For example, in the embodiment illustrated in FIG. 7, the first seal 86 delimits the first receiving area 88 in the first axial direction, such that fluid 53 is generally prevented from flowing out of the first receiving area 88 in the first axial direction beyond the first seal 86. A variety of types of seals are contemplated (e.g., ring seal, etc.).

Referring now to FIGS. 1, 2, and 7-9, the housing 22 of the electric drive unit 10 can include a second holding portion 90 that is disposed on a second axial side of the collar portion 24 opposite the first axial side. As illustrated in FIGS. 2 and 7, the collar portion 24 is positioned axially between the first holding portion 82 and the second holding portion 90. The second holding portion 90 may be operable to receive fluid 53 from the first receiving area 88 via at least one conduit 92 extending between the first holding portion 82 and the second holding portion 90, as described further herein.

As illustrated in FIG. 7, a second seal 94 is positioned radially between the output shaft 20 and the second holding portion 90 of the housing 22. The second seal 94 is configured to cooperate with the second holding portion 90 to define a second receiving area 96 for receiving fluid 53 therein. In some implementations, the second seal 94 delimits the second receiving area 96 in a second axial direction that is opposite the first axial direction. For example, in the embodiment illustrated in FIG. 7, the second seal 94 delimits the second receiving area 96 in the second axial direction, such that fluid 53 is generally prevented from flowing out of the second receiving area 96 in the second axial direction beyond the second seal 94.

Referring still to FIG. 7, the electric drive unit 10 includes a bearing 98 that is positioned radially between the output shaft 20 and the second holding portion 90 of the housing 22. The bearing 98 is configured to support and facilitate rotation of the output shaft 20 relative to the housing 22. As illustrated in FIG. 7, the bearing 98 is disposed within the second receiving area 96. As such, the bearing 98 may be lubricated by fluid 53 that is received within the second receiving area 96.

Referring now to FIGS. 1, 2, and 7-9, the housing 22 of the electric drive unit 10 includes at least one conduit 92. The at least one conduit 92 extends between the first holding portion 82 of the housing 22 and the second holding portion 90 of the housing 22. As illustrated in FIG. 7, the first receiving area 88 and the second receiving area 96 are in fluid communication via the at least one conduit 92. The at least one conduit 92 of the housing 22 is disposed radially outboard of the interior surface 26 of the collar portion 24. In the embodiment illustrated in FIG. 7, at least a portion of the at least one conduit 92 is axially aligned with and radially outboard of the interior surface 26 of the collar portion 24.

Figure 9:
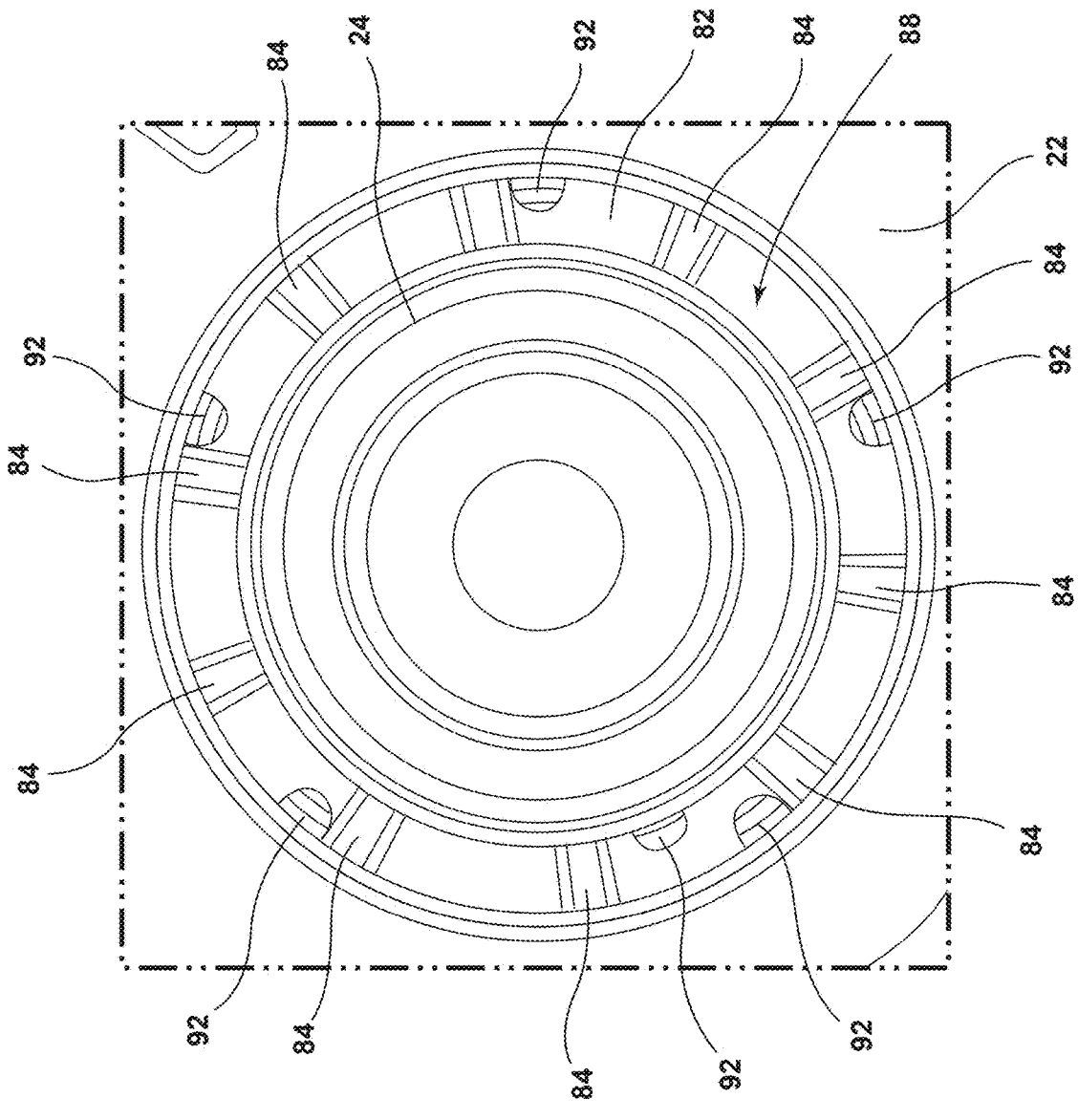
FIG. 9 is an enlarged view of area IX of FIG. 8 illustrating the plurality of baffles and a plurality of conduits of the housing.

In various implementations, the at least one conduit 92 include a plurality of conduits 92. In the embodiment illustrated in FIGS. 8 and 9, the housing 22 includes the plurality of conduits 92, and the plurality of conduits 92 are distributed circumferentially relative to each other. As illustrated in FIG. 9, the plurality of conduits 92 are at least partially radially aligned with adjacent baffles 84 of the plurality of baffles 84 of the first holding portion 82, and the plurality of conduits 92 are positioned circumferentially between adjacent baffles 84 of the first holding portion 82.

Referring now to FIGS. 1-9, in operation of an exemplary embodiment of the electric drive unit 10, fluid 53 is conveyed along the fluid flow path 30 during operation of the electric drive unit 10. The fluid 53 includes a first portion 100 of fluid 53 and a second portion 102 of fluid 53. The first and second portions 100, 102 of fluid 53 exit the fluid chamber 42 and flow to the passage 28 of the housing 22. The first and second portions 100, 102 of fluid 53 first enter the first portion 64 of the passage 28 then flow generally radially inboard toward the second portion 66 of the passage 28. The endpoint 68 of the second portion 66 of the passage 28 is substantially tangentially aligned with the abutting portion of the substantially cylindrical interior surface 26 of the collar portion 24 of the housing 22. As such, the first and second portions 100, 102 of fluid 53 flow from the passage 28 and onto the collar portion 24 in a manner that encourages the fluid 53 of the first and second portions 100, 102 of fluid 53 to flow circumferentially along the interior surface 26 of the collar portion 24.

Next, the first portion 100 of fluid 53 flows from the interior surface 26 of the collar portion 24 through the opening 16 at the axial end 18 of the rotor shaft 50 in the first axial direction, wherein the first portion 100 of the fluid 53 is propelled axially within the hollow 14 toward the gearbox 32 of the electric drive unit 10. Generally simultaneously, the second portion 102 of the fluid 53 flows from the interior surface 26 of the collar portion 24 to the first receiving area 88 defined by the first holding portion 82 of the housing 22 and the first seal 86. As illustrated in FIG. 7, the first receiving area 88 is axially offset from the interior surface 26 of the collar portion 24 in the first axial direction. As such, the second portion 102 of the fluid 53 flows to the first holding portion 82 in the first axial direction from the collar portion 24 of the housing 22. In the first receiving area 88, the second portion 102 of the fluid 53 is proximate the outer rotor shaft surface 56 of the rotor shaft 50, such that rotation of the rotor shaft 50 as driven by the electric motor 12 encourages the second portion 102 of the fluid 53 within the first receiving area 88 to flow circumferentially along the first holding portion 82 of the housing 22. This circumferential flow can undesirably raise the pressure of the fluid 53 within the first receiving area 88. The baffles 84 of the first holding portion 82 of the housing 22, thus, disrupt the circumferential flow of the fluid 53 within the first receiving area 88 to manage this phenomenon.

Next, the second portion 102 of the fluid 53 within the first receiving area 88 flows from the first holding portion 82 to the second holding portion 90 via at least one of the plurality of conduits 92 in the second axial direction that is opposite of the first axial direction. As such, the second portion 102 of the fluid 53 is received within the second receiving area 96, and the bearing 98 positioned radially between the second holding portion 90 of the housing 22 and the output shaft 20 is lubricated by the second portion 102 of the fluid 53 within the second receiving area 96.

The electric drive unit 10 of the present disclosure may provide a variety of advantages. First, the housing 22 including the passage 28 that extends substantially tangentially outward from the substantially cylindrical interior surface 26 of the collar portion 24 of the housing 22 may increase the efficiency of fluid flow from the passage 28 to the collar portion 24. Second, the increased efficiency of fluid flow provided by the tangentially aligned passage 28 and collar portion 24 of the housing 22 may allow fluid 53 to be propelled along the fluid flow path 30 via rotation of the rotor shaft 50 and without the use of an auxiliary fluid pump. Third, the tapered inner rotor shaft surface 54 may allow for fluid 53 to be conveyed axially along the rotor shaft 50 as the rotor shaft 50 rotates. Fourth, the deflector 72 extending circumferentially about the output shaft 20 and being axially aligned with the collar portion 24 and the passage 28 of the housing 22 may encourage fluid 53 to flow into the hollow 14 defined by the rotor shaft 50 rather than onto the outer surface of the output shaft 20, which may increase the efficiency of fluid flow within the fluid flow path 30. Fifth, the first receiving area 88 provides a region that fluid 53 can flow if the fluid 53 does not enter the opening 16 at the axial end 18 of the rotor shaft 50 from the collar portion 24 of the housing 22. Sixth, the one or more baffles 84 of the first holding portion 82 of the housing 22 disrupt circumferential flow of fluid 53 within the first receiving area 88, such that pressure within the first receiving area 88 is decreased. Seventh, the one or more conduits 92 extending between the first receiving area 88 and the second receiving area 96 allow for fluid 53 to flow in the second axial direction from the first receiving area 88 to the second receiving area 96, which further helps to manage the amount of pressure within the first receiving area 88. Eighth, the bearing 98 being disposed within the second receiving area

96 allows for convenient lubrication and/or cooling of the bearing 98 during operation of the electric drive unit 10.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 electric drive unit
12 electric motor
14 hollow
16 opening
18 axial end
20 output shaft
22 housing
24 collar portion
26 interior surface
28 passage
30 fluid flow path
32 gearbox
34 gearset
36 differential
38 sump
40 heat exchanger
42 fluid chamber
44 stator
46 rotor
48 stator carrier
50 rotor shaft
52 fluid jacket
54 inner rotor shaft surface
56 outer rotor shaft surface
58 axis
60 radial center point
62 inner surface
64 first portion (of the passage)
66 second portion (of the passage)
68 endpoint
70 trough
72 deflector
74 outer ring
76 inner ring
78 connector ring
80 annular surface
82 first holding portion
84 baffle
86 first seal
88 first receiving area
90 second holding portion
92 conduit
94 second seal
96 second receiving area
98 bearing
100 first portion (of fluid)
102 second portion (of fluid)

What is claimed is:

1. A drive unit for a vehicle, comprising:
an electric motor that includes a rotor shaft having an inner rotor shaft surface that defines a hollow that is accessible via an opening defined at an axial end of the rotor shaft and an outer rotor shaft surface opposite the inner rotor shaft surface;
an output shaft that extends into the hollow through the opening; and a housing that houses the electric motor and defines a fluid flow path that conveys fluid, the housing having a collar portion that extends circumferentially about the output shaft, a first holding portion disposed on a first axial side of the collar portion and having a plurality of baffles that are circumferentially offset from each other, a second holding portion disposed on a second axial side of the collar portion opposite the first axial side, such that the collar portion is positioned axially between the first and second holding portions, and a plurality of conduits extending between the first holding portion and the second holding portion,
wherein the fluid flow path is configured to convey the fluid, such that a first portion of the fluid flows onto the collar portion via a passage of the housing and through the opening into the hollow defined by the inner rotor shaft surface in a first axial direction, and a second portion of the fluid flows onto the collar portion via the passage of the housing, from the collar portion to the first holding portion in the first axial direction, and from the first holding portion to the second holding portion via at least one of the plurality of conduits in a second axial direction opposite the first axial direction.

2. The drive unit of claim 1, wherein the electric motor is configured to drive rotation of the rotor shaft, rotation of the rotor shaft encourages circumferential flow of fluid along the first holding portion of the housing, and the plurality of baffles are configured to disrupt the circumferential flow of fluid along the first holding portion of the housing.

3. The drive unit of claim 2, wherein each of the plurality of baffles is radially elongated.

4. The drive unit of claim 1, further comprising:
a first seal positioned radially between the outer rotor shaft surface and the first holding portion of the housing and configured to cooperate with the first holding portion of the housing to define a first receiving area for fluid.

5. The drive unit of claim 4, wherein the first seal delimits the first receiving area in the first axial direction.

6. The drive unit of claim 5, further comprising:
a second seal positioned radially between the output shaft and the second holding portion of the housing and configured to cooperate with the second holding portion to define a second receiving area for fluid that is in fluid communication with the first receiving area via the plurality of conduits.

7. The drive unit of claim 6, wherein the second seal delimits the second receiving area in the second axial direction.

8. The drive unit of claim 7, further comprising:
a bearing positioned radially between the output shaft and the second holding portion of the housing and configured to support and facilitate rotation of the output shaft relative to the housing, wherein the bearing is disposed within the second receiving area and is configured to be lubricated by fluid that enters the second receiving area via the plurality of conduits.

9. A drive unit for a vehicle, comprising:
an electric motor that includes a rotor shaft that defines a hollow that is accessible via an opening defined at an axial end of the rotor shaft;
an output shaft that extends into the hollow through the opening; and
a housing that houses the electric motor and defines a fluid flow path that conveys fluid, the housing having a collar portion that extends circumferentially about the output shaft and a first holding portion disposed on a first axial side of the collar portion and having at least one baffle, wherein the fluid flow path is configured to convey the fluid, such that a first portion of the fluid flows onto the collar portion via a passage of the housing and through the opening into the hollow defined by the rotor shaft in a first axial direction, and a second portion of the fluid flows onto the collar portion via the passage of the housing and from the collar portion to the first holding portion in the first axial direction, and wherein the at least one baffle is configured to disrupt circumferential flow of the second portion of the fluid along the first holding portion of the housing.

10. The drive unit of claim 9, wherein the at least one baffle comprises a plurality of baffles that are circumferentially offset from each other.

11. The drive unit of claim 9, wherein the at least one baffle is radially elongated.

12. The drive unit of claim 9, further comprising:
a first seal positioned radially between the rotor shaft and the first holding portion of the housing and configured to cooperate with the first holding portion of the housing to define a first receiving area for the fluid.

13. The drive unit of claim 12, wherein the first seal delimits the first receiving area in the first axial direction.

14. The drive unit of claim 9, wherein the housing further comprises:
a second holding portion disposed on a second axial side of the collar portion opposite the first axial side, such that the collar portion is positioned axially between the first and second holding portions; and
at least one conduit extending between the first holding portion and the second holding portion, wherein the second portion of the fluid further flows from the first holding portion of the housing to the second holding portion of the housing via the at least one conduit.

15. A drive unit for a vehicle, comprising:
an electric motor that includes a rotor shaft that defines a hollow that is accessible via an opening defined at an axial end of the rotor shaft;
an output shaft that extends into the hollow through the opening; and
a housing that houses the electric motor and defines a fluid flow path that conveys fluid, the housing having a collar portion that extends circumferentially about the output shaft, a first holding portion disposed on a first axial side of the collar portion, a second holding portion disposed on a second axial side of the collar portion opposite the first axial side, and at least one conduit that extends between the first holding portion and the second holding portion,
wherein the fluid flow path is configured to convey the fluid, such that a first portion of the fluid flows onto the collar portion via a passage of the housing and through the opening into the hollow defined by the rotor shaft in a first axial direction, and a second portion of the fluid flows onto the collar portion via the passage of the housing, from the collar portion to the first holding portion in the first axial direction, and from the first holding portion to the second holding portion via the at least one conduit in a second axial direction opposite the first axial direction.

16. The drive unit of claim 15, wherein the at least one conduit comprises:
a plurality of conduits that extend between the first holding portion and the second holding portion.

17. The drive unit of claim 16, further comprising:
a first seal positioned radially between an outer rotor shaft surface and the first holding portion of the housing and configured to cooperate with the first holding portion of the housing to define a first receiving area for fluid, wherein the first seal delimits the first receiving area in the first axial direction.

18. The drive unit of claim 17, further comprising:
a second seal positioned radially between the output shaft and the second holding portion of the housing and configured to cooperate with the second holding portion to define a second receiving area for fluid that is in fluid communication with the first receiving area via the plurality of conduits, wherein the second seal delimits the second receiving area in the second axial direction.

19. The drive unit of claim 18, further comprising:
a bearing positioned radially between the output shaft and the second holding portion of the housing and configured to support and facilitate rotation of the output shaft relative to the housing, wherein the bearing is disposed within the second receiving area and is configured to be lubricated by fluid that enters the second receiving area via the plurality of conduits.

20. The drive unit of claim 15, wherein the first holding portion of the housing includes at least one baffle that is configured to disrupt the circumferential flow within a first receiving area defined by the first holding portion of the housing.

* * * * *